United States Patent [19]

van der Lely

[11] 4,008,855

[45] Feb. 22, 1977

[54] SPREADING IMPLEMENTS

[76] Inventor: Cornelis van der Lely, 7, Bruschenrain, Zug, Switzerland

[22] Filed: Apr. 15, 1975

[21] Appl. No.: 568,262

[30] Foreign Application Priority Data

Apr. 25, 1974 Netherlands .................... 7405556

[52] U.S. Cl. .............................. 239/682; 222/193; 239/689
[51] Int. Cl.² ......................................... B67D 5/60
[58] Field of Search .......... 239/654, 656, 681, 689, 239/682, 687; 222/193, 561

[56] References Cited

UNITED STATES PATENTS

| | | | |
|---|---|---|---|
| 1,776,814 | 9/1930 | Lutz | 239/682 |
| 3,417,926 | 12/1968 | Vovak | 239/682 |
| 3,730,395 | 5/1973 | Gallagly et al. | 222/193 |
| 3,777,992 | 12/1973 | de Koning | 239/689 |

*Primary Examiner*—Joseph F. Peters
*Assistant Examiner*—Richard A. Bertsch
*Attorney, Agent, or Firm*—Mason, Mason & Albright

[57] ABSTRACT

A spreading implement has a container with ports that lead into an air chamber pressured by a blower device. Delivery ducts communicate with the chamber and ports to receive material from an ejector disc rotatably mounted adjacent the ports. The ducts extend horizontally from the ports in a direction transverse to the direction of travel. The ducts have outlets that are spaced apart from one another and each outlet comprises a movable spreading member located adjacent the outlet end. The spreading members can be flexible hoses or pivotable discs that are rockable by a common driving mechanism or the members can be bladed or rotatable nozzles so that during operation material is spread over a wide area by each spreading member.

32 Claims, 13 Drawing Figures

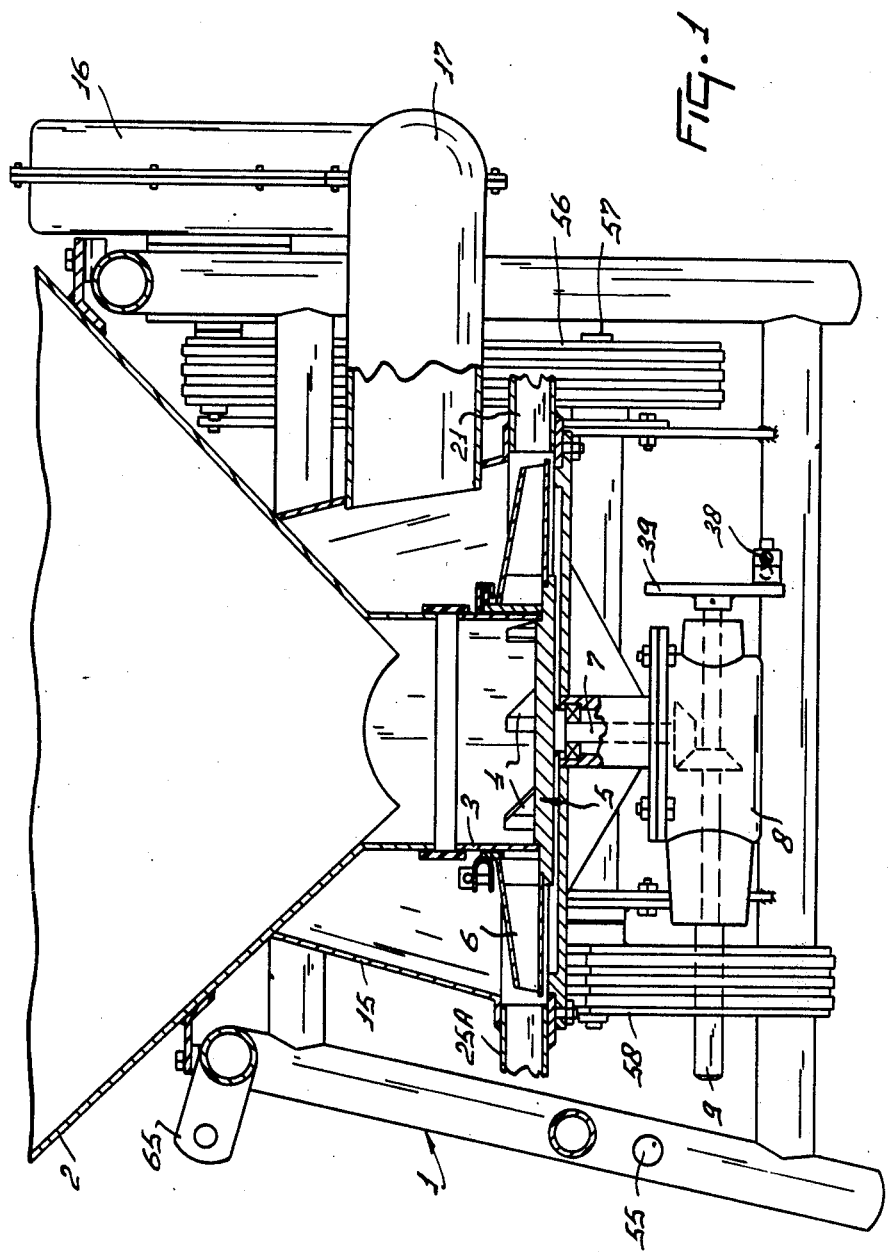

U.S. Patent  Feb. 22, 1977  Sheet 2 of 4  4,008,855
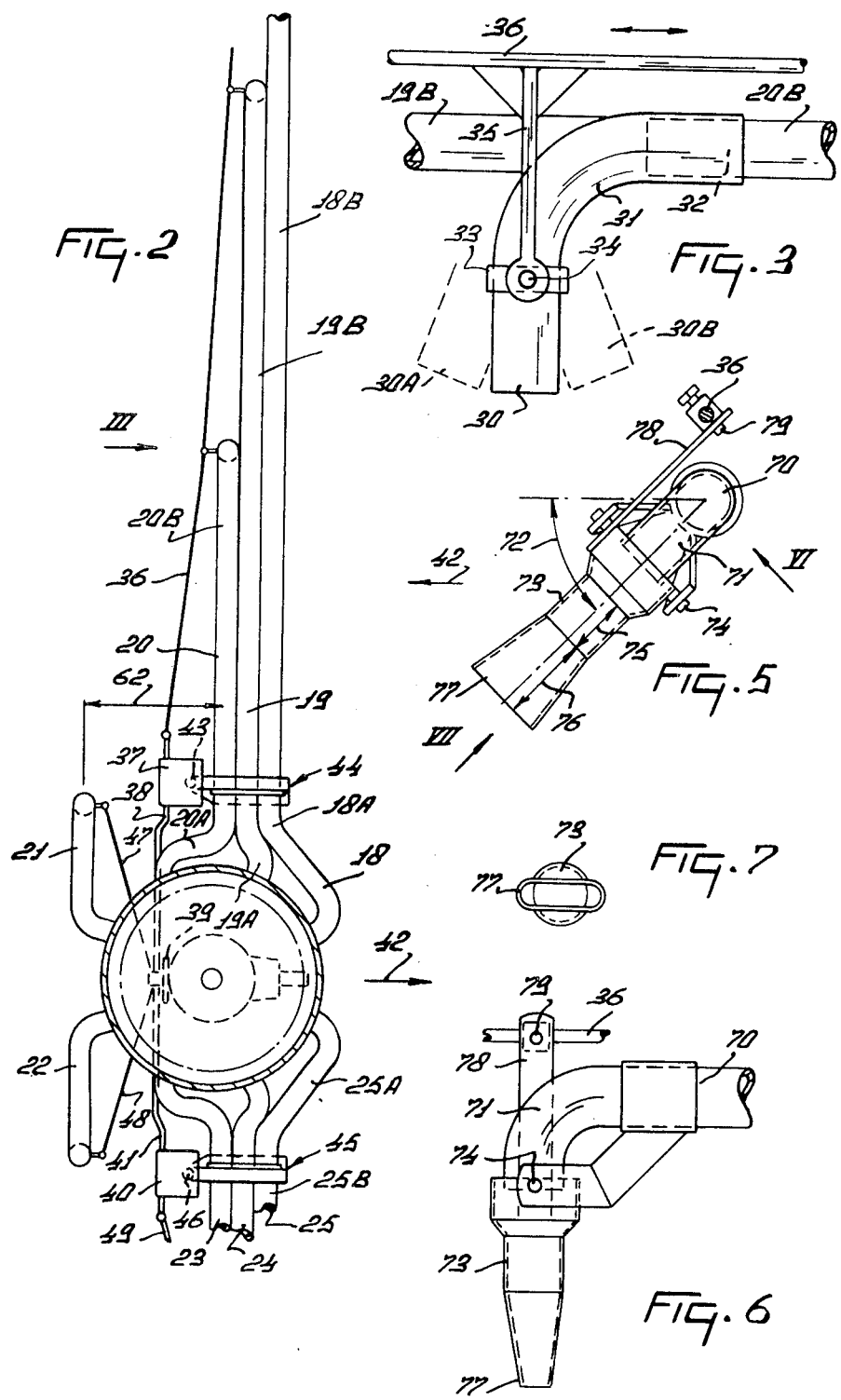

SPREADING IMPLEMENTS

According to the invention, there is provided an implement of the kind set forth, wherein a spreading member is movably mounted in the proximity of an outlet of the or each delivery duct in such a way that material emanating from the or each outlet end in the use of the implement is distributed by the spreading member or corresponding spreading member.

For a better understanding of the invention, and to show how the same may be carried into effect, reference will now be made, by way of example, to the accompanying drawings in which:

FIG. 1 is a part-sectional side elevation of a spreading implement in accordance with the invention, FIG. 2 is a somewhat diagrammatic part-sectional plan view illustrating the construction and arrangement of delivery ducts of the implement.

Figure 4:
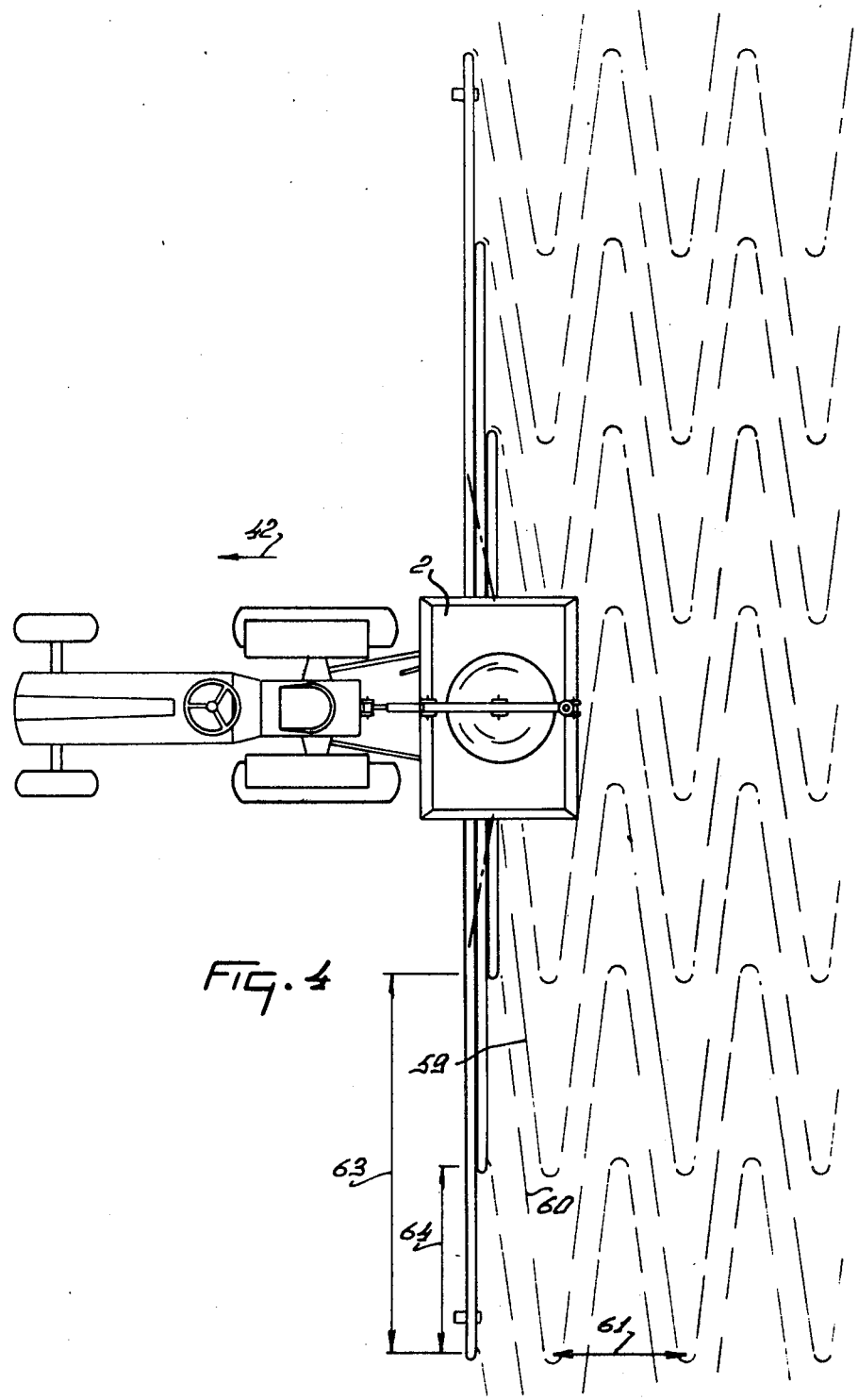
Figure 8:
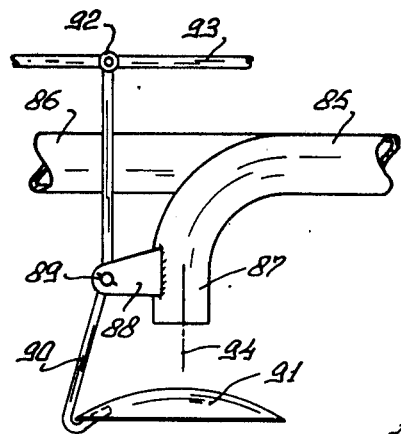
Figure 9:
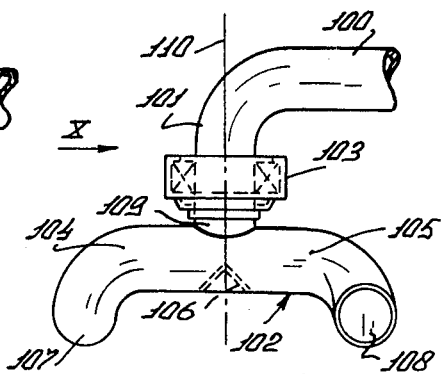
Figure 10:
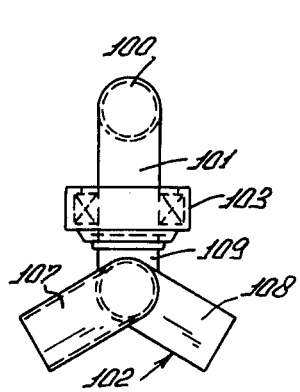
Figure 11:
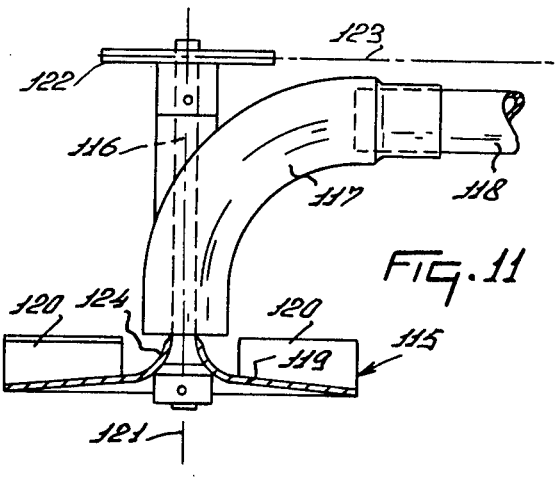
Figure 12:
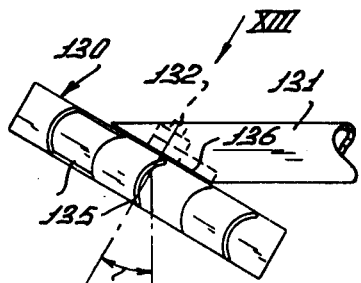
Figure 13:
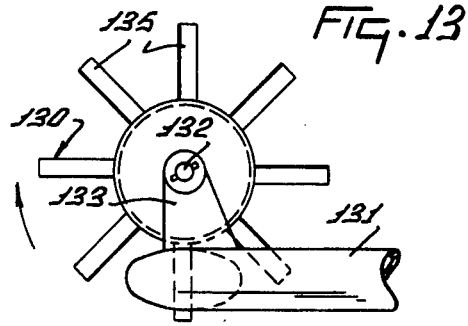

FIG. 3 is an elevation, to an enlarged scale, as seen in the direction indicated by an arrow III in FIG. 2, FIG. 4 is a diagrammatic plan view illustrating the material distribution pattern that is obtained during the use of the implement, FIG. 5 corresponds to FIG. 3 but illustrates an alternative conctruction, FIG. 6 is a view as seen in the direction indicated by an arrow VI in FIG. 5, FIG. 7 is a view as seen in the direction indicated by an arrow VII in FIG. 5, FIG. 8 is a rear elevation otherwise substantially corresponding to FIG. 3 but illustrating a further alternative construction, FIG. 9 illustrates another alternative construction of a spreading member at the outlet end of a delivery duct, FIG. 10 is an elevation as seen in the direction indicated by an arrow X in FIG. 9, FIG. 11 is a part-sectional diagrammatic elevation illustrating a further alternative form of spreading member at the outlet end of a delivery duct, FIG. 12 is an elevation illustrating the outlet end of a delivery duct and further associated form of spreading member, and FIG. 13 is a view as seen in the direction indicated by an arrow XIII in FIG. 12,.

Referring to FIGS. 1 to 3 of the drawings, the spreading implement which is illustrated has a transportable frame 1 upon which is mounted a material container in the form of a hopper 2. The bottom of the hopper 2 is provided with a cylindrical outlet portion 3 in the wall of which is formed a plurality, such as three, of outlet ports 4, the outlet ports 4 being angularly spaced apart from one another about the upright longitudinal axis of the portion 3. The lowermost edge of the cylindrical outlet portion 3 rests upon the upper surface of a stepped ejector disc 5 around the outer edge of which is arranged a plurality of spreading blades 6, the blades 6 being disposed in regularly spaced apart relationship around the edge of the disc 5 in such a way that the inner material-receiving end of each blade 6 is closed to the outer wall of the portion 3 in which the ports 4 are formed. There is, however, sufficient clearance for the interposition of a masking member carrying masking plates by which the outlet ports 4 can be closed to a chosen extent. One of the masking plates can be seen immediately to the right of the cylindrical outlet portion 3 in FIG. 1 of the drawings. The ejector disc 5 is secured to the upper end of a substantially vertical rotary shaft 7 which is driven from bevel pinions contained within a gear box 8 by a substantially horizontal driving shaft 9. The leading end of the driving shaft 9 projects forwardly from the implement in substantially the intended direction of operative travel 42 (FIG. 4) thereof and is provided with splines or at least one other key (not shown in FIG. 1) by which it can be placed in driven connection with the power take-off shaft of an operating agricultural tractor or other vehicle through the intermediary of a known telescopic transmission shaft (not shown) having universal joints at its opposite ends.

The cylindrical outlet portion 3 does not, of course rotate with the disc 5 and is surrounded by an air chamber 15 which is fed with air from a fan or blower 16 by an air duct 17. A plurality of delivery ducts of which, in the example that is being described there are eight ducts 18 to 25 inclusive, are connected to the periphery of the air chamber 15 at the foot thereof. It will be seen from FIG. 2 of the drawings that the eight ducts 18 to 25 inclusive are connected to the chamber 15 at regular 45L intervals around the upright longitudinal axis of that chamber. Each delivery duct is provided. at or near its outlet end. with a corresponding spreading member but the eight spreading members are of substantially identical construction so that it is only necessary to describe the spreading member associated with the outlet end of the delivery duct 20 in greater detail and particular reference is directed to FIG. 3 of the drawings for this purpose.

The spreading member that is located at the outlet end of the delivery duct 20 that is shown in FIG. 3 of the drawings comprises a spreading nozzle 30 that is connected by a curved but flexible tube 31 with the outlet end 32 of the duct 20 itself. The delivery duct 20, and all of the other seven ducts in this embodiment, is of circular cross-section and the cross-sections of the nozzles 30 and flexible tube 31 are the same. The nozzle 30 is surrounded by a ring 33 at substantially its junction with the tub 31 and aligned trunnion pins 34 pivotably connect that ring 33 to one end of a corresponding coupling rod 35. The opposite end of the coupling rod 35 is rigidly and substantially perpendicularly secured to a driving rod 36 which driving rod, in turn, is connected by a transmission 37 that is not illustrated in detail in the drawings to a further driving rod 38 eccentrically coupled to a wheel to further driving rod 38 eccentrically coupled to a wheel 39 carried at the rearmost end of the substantially horizontal driving shaft 9. The single driving rod 36 is also connected to spreading nozzles that are substantially identical to the spreading nozzle 30 but that are mounted to the outlet end of the delivery ducts 18 and 19. Moreover, a driving rod 49 is symmetrically similarly connected to three spreading nozzles that are substantially identical to the spreading nozzle 30, said three spreading nozzles being located at the outlet ends of the delivery ducts 23, 24 and 25. The driving rod 49 is connected to a transmission 40 and that transmission is eccentrically linked to the wheel 39 by a further driving rod 41.

The three delivery ducts 18, 19 and 20 that are located at the left-hand side of a vertical plane of substantial symmetry of the implement that contains the longitudinal axis of the shaft 9 and that is parallel to the direction 42 (FIGS. 2 and 4) each comprises two portions A and B, the three portions 18B, 19B and 20B being turnable relative to the three portions 18A, 19A and 20A about substantially vertical axis of a pivotal shaft 43 located close to the transmission 37. When the implement is in the use, the three portions 18B to 20B join the three portions 18a to 20A respectively by way of a fluid-tight connector 44 that is not shown in the drawings in detail and which may be of a kind which is known per se. The transmission 37 is of a kind which will allow the three duct portions 18B, 19B and 20B to be turned about the pivotal shaft 43 with the driving rod 36 to break the fluid-tight coupling that is afforded by the connector 44, the duct portions 18a, 19A and 20A being substantially rigid with the air chamber 15. The three ducts 23, 24 and 25 that are symmetrically identical to the ducts 18, 19 and 20 are each similarly divided into two portions A and B, the portions B being turnable about the substantially vertical axis of a pivotal shaft 46 relative to the portions A and a fluid-tight connector 45 being provided to couple the portions A and B reliably to one another when the implement is in operation.

The two shortest delivery ducts 21 and 22 are not formed as relatively pivotable portions and it will be seen from the drawings that spreading members at their outlet ends, which spreading members are substantially identical to the previously described spreading nozzle 30, are eccentrically connected to the wheel 39 by corresponding driving rods 47 and 48. The delivery ducts 21 and 22 are substantially symmetrical with respect to the aforementioned substantially vertical plane that contains the longitudinal axis of the driving shaft 9 and that is parallel to the intended direction of operative travel 42 of the implement.

In the use of the spreading implement that has been described with reference to FIGS. 1 to 3 of the drawings, substantially horizontally aligned pins 55 at the front of the implement frame 1 are connected to the lower lifting links of the three-point lifting device or hitch of an operating tractor or other vehicle and a pair of lugs 65 that project forwardly from the front of the frame 1 are pivotally connected to the free end of the upper adjustable lifting link of the same three-point lifting device or hitch. The leading end of the driving shaft 9 is connected, in the manner described above, to the power take-off shaft of the same tractor or other operating vehicle by way of a known intermediate telescopic transmission shaft (not illustrated) having universal joints at its opposite ends. A supply of the material that is to be spread is introduced into the hopper 2 and the implement is then ready to be moved over a surface that is to be spread with such material. The implement that has been described by way of example with reference to FIGS. 1 to 3 of the drawings is constructed and arranged for distributing solid materials in particulate form such as, for example, powdered or granular artificial fertilisers and the like. However an implement in accordance with the invention may also be employed for the spreading normally by spraying, of liquid materials.

As the implement moves in the direction 42 over a field that is to be spread with granular artificial fertiliser, the power take-off shaft of the tractor illustrated in FIG. 4 rotates the driving shaft 9 and consequently the substantially vertical shaft 7 to which the stepped ejector disc 5 is secured. It will be noted from FIG. 1 of the drawings that a driving shaft of the fan or blower 16 is coupled by a transmission 56 to on end of a substantially horizontal shaft 57 and that, in turn, the opposite end of that shaft 57 is coupled by a further transmission 58 to the driving shaft 9 at a location in front of the gear box 8. The fan or blower 16 is thus driven upon rotation of the shaft 9. When the outlet ports 4 in the cylindrical outlet portion 3 of the hopper 2 are opened to a chosen extend by appropriately positioning the corresponding masking plates that have been briefly referred to above, the granular artificial fertiliser within the hopper 2 will flow through the outlet ports 4 onto the surface of the rapidly rotating disc 5, the settings of the masking plates that are chosen relative to the outlet ports 4 determining the volume of material per unit time which reaches the disc 5 and thus the volume of material per unit area of ground traversed by the implement assuming a constant speed of operative travel thereof. The rapid rotation of the disc 5 causes the material which reaches it from the ports 4 to be thrown centrifugally outwardly into contact with the spreading blades 6 which blades, it will be remembered, rotate with the disc 5. The material is thrown outwardly from the radially outer ends of the blades 6 and into the receiving ends of the eight ducts 18 to 25 inclusive. Obviously, some material will not be thrown directly into the receiving ends of the ducts but the stream of air that is supplied into the chamber 15 from the fan or blower 16 substantially immediately entrains material within the chamber 15 and carries it into the ducts 18 and 25. There is no significant tendency for the air stream to escape back to the atmosphere by way of the outlet ports 4 and the hopper 2 because, except when the hopper is empty or almost empty, the material to be spread effectively seals that exit and because the rapidly rotating blades 6 have the effect of a radial flow blower that opposes movement of air from the chamber 15 to the hopper 2.

The air stream from the fan or blower 16 is subdivided into eight streams which flow, with entrained material, throught the corresponding eight ducts 18 to 25 inclusive towards the spreading nozzles 30 located at the outlet ends of those ducts. The four driving rods 36, 47 48 and 49 are all caused to reciprocate by their direct or indirect eccentric connections to the wheel 39 in the manner that is indicated at the top of FIG. 3 of the drawings. Thus, the eight outlet nozzles 30 are caused to rock to and fro between the extreme positions 30A and 30B that are shown in broken lines in FIG. 3, the rocking movement of each nozzle 30 taking place about a corresponding imaginary substantially horizontal axis that passes through the corresponding curved but flexible tube 31. As the nozzles 30 rock to and fro, the material leaves their lowermost ends as a result of the combined air flow through the delivery ducts and the centrifugal force initially imparted to the material by the disc 5. The nozzles 30 provide a satisfactory distribution pattern of the material from the hopper 2 over the ground surface. Each of the spreading nozzles 30 extends downwardly away from the outlet end 32 of the corresponding delivery duct and is caused to rock as a result of the reciprocation of one of the four driving rods 36, 47, 48 or 49. All eight of the spreading nozzles 30 are coupled eccentrically to the same location on the wheel 39 and all of them rock, during operation of the implement, about axes that are substantially parallel to the direction of travel 42. The use of a single eccentric location on the wheel 39 ensures that all eight spreading nozzles 30 move synchronously to the left and to the right so that material from each nozzle 30 will fall to the ground along a path of zig-zag formation. FIG. 4 of the drawings shows examples of such paths that are produced during the operation of the implement and, in particular, indicates zig-zag paths 59 and 60 corresponding to two immediately neighbouring outlet nozzles 30.

It will be evident from a study of FIG. 4 of the drawings that all eight of the zig-zag paths (including the paths 59 and 60) fit one within the other as a result of the synchronous movement of all eight nozzles 30. A very satisfactory uniform distribution of the material over the ground surface thus results. The speed of travel of the implement in the direction 42 and the number of revolutions of the wheel 39 per unit time may be matched to one another in such a way as to govern closely the distribution pattern of the material that is produced. For example, by an appropriate choice of the number of oscillations of each nozzle 30 per unit time in relation to the speed of travel in the direction 42, a required length of each zig-zag path per unit time can be produced. The nozzles 30 corresponding to the two ducts 21 and 22 are spaced behind those corresponding to the two ducts 20 and 23 by a distance 62 (FIG. 2) that extends parallel to the direction 42. The magnitude of the distance 62 is such that the corresponding zig-zag paths (see FIG. 4) will fit midway between those produced by the nozzles 30 corresponding to the two ducts 20 and 23. The speed of flow the the material through the ducts which is produced, the dimensions of the nozzles 30 and the drive to those nozzles are such that the amplitude 63 (FIG. 4) of each zig-zag path (in fact, of the zig-zag path 60 in FIG. 4) is twice the distance 64 between two immediately neighbouring nozzles 30. It will be evident from FIG. 4 of the drawings that a distance 61 which is indicated therein denotes the distance travelled by the implement in the direction 42 during one complete oscillation of the nozzle 30 that produces the zig-zag path 60.

An implement in accordance with the invention is of a simple overall construction and, in particular, its eight spreading members are of uncomplicated and inexpensive formation. The implement can readily be cleaned and its operation is very reliable. In particular, when the implement is to be transported from one place to another without performing any working operation, the portions B of the six ducts 18, 19, 20, 23, 24 and 25 are turned rearwardly about the axes of the shafts 43 and 46 after releasing the fluid-tight connectors 44 and 45. This greatly reduces the path of travel of the implement as compared with the width of the path of travel which it has during operation (FIG. 4). Moreover, if desired, the portions B can be maintained in their operative positions by springloaded latches forming parts of the connectors 44 and 45 so that, should one or the other or both of the two groups of portions B meet an unyielding obstacle during travel in the direction 42, at least one of the spring-loaded latches will be released and the corresponding group or groups will swing rearwardly to allow the obstacle to be passed by without damage occuring.

FIGS. 5, 6 and 7 of the drawings illustrate a spreading member construction and arrangement in which each delivery duct has an outlet end 70 which is provided with a downwardly directed curved portion 71. However, the downwardly directed curved portion 71 is not vertically disposed but has its longitudinal axis inclined at an angle 72 (FIG. 5) to the horizontal, said angle 72 conveniently having a magnitude of substantially 45L. A spreading member 73 adjoins the delivery end of the portion 71 and is turnable relative to that portion about an axis defined by aligned pins 74 that are supported from the outlet end 70 of the associated delivery duct by a bracket. The pivotal axis defined by the pins 74 is perpendicular to the longitudinal axis of the portion 71 at the free end of the latter. The spreading member 73 has a portion 75 that is of circular cross-section which is followed by a longer portion 76 which is of flattened formation so that a slot-like outlet port 77 is produced at its free end. It will be seen from a comparison of FIGS. 5 and 6 of the drawings that the portion 76 diverges from the portion 75 towards the outlet port 77 as seen in one direction but tapers towards that port when seen in a relatively perpendicular direction. The greatest length of the slot-like outlet port 77 is contained in a substantially vertical plane that is parallel to the direction 42 and is inclined to both the horizontal and the vertical at an angle which may conveniently be substantially 45L.

An arm 78 has one end rigidly secured to the spreading member 73 and has its opposite end connected to the driving rod 36 by a pivot 79. The driving rod 36 is arranged to be reciprocated in the same manner as has already been described in connection with the first embodiment and the eight spreading members 73 that correspond to the eight delivery ducts 18 to 25 inclusive are all arranged so that they will rock synchronously about the axes defined by the corresponding pins 74 to spread material from the hopper 2 along zig-zag paths as is illustrated in FIG. 4. when the spreading member 73 of FIGS. 5 to 7 of the drawings are employed, the material is ejected downwardly towards the ground surface but also forwardly with respect to the direction of travel 42 by virtue of the inclined disposition of each spreading member 73 that can be seen best in FIG. 5 of the drawings. The described and illustrated shape of each outlet port 77 is conducive to uniformity of distribution of the material over the ground surface.

FIG. 8 of the drawings illustrates a delivery duct and spreading member embodiment in which two delivery ducts 85 and 86 are illustrated that substantially correspond to the ducts 18 and 19 that have previously been described in detail. The delivery duct 85 has an outlet end 87 that is of downwardly directed curved formation although a short lowermost terminal part thereof is rectilinear. A lug 88 is fastened to the outlet end 87 close to its mouth and a rod 90 is rockably connected to that lug 88 by a pivot 89. The lowermost end of the rod 90 carries a spreading member in the form of a cap 91 that is of regular spherically curved configuration. The convex surface of the cap 91 is located beneath the mouth of the outlet end 87 of the duct 85 with a central region thereof in alignment with the longitudinal axis 94 of the rectilinear terminal part of said end 87. The upper end of the rod 90 is connected by a pivot 92 to a location on a reciprocable driving rod 93 that is similarly constructed and arranged to the previously described driving rod 36, FIG. 8 of the drawings is a similar view to FIG. 3 thereof and it will therefrom be realised that the axes defined by the pivots 89 and 92 both extend substantially parallel to the direction 42.

During the operation of the implement when furnished in accordance with FIG. 8 of the drawings, material delivered from the outlet end 87 of the duct 85 will strike the convex surface of the cap 91 which will be rocking to and fro about the axis defined by the pivot 89. The individual granules of material will bounce in different directions away from the surface of the cap 91 and, since the position of that cap relative to the axis 94 is continually changing as a result of the rocking motion about the axis of the pivot 89, the material will fall to the ground at constantly changing locations relative to the outlet end 87. The material is thus uniformly spread over a strip of ground that corresponds to the cap 91 under consideration. The shape and location of the cap 91 are chosen so that the outlet end 87 of the duct 85 will co-operate with that cap in the use of the implement in distributing the material over a strip of land whose width is substantially twice the distance between two immediately neighbouring caps 91. The strips of land corresponding to the eight neighbouring caps 91 will thus at least partly overlap each other with the result that a very uniform distribution of the material across the working width of the implement is produced except, perhaps, at the extreme margins of the width of travel. This can, of course, readily be compensated for merely by overlapping the edge regions of successive traverses of a field or other area of land to the required extent. When, as is illustrated in FIG. 8 of the drawings, each of the caps 91 is at the midpoint of its rocking movement about the axis defined by the corresponding pivot 89, the center point of that cap is in alignment with the corresponding axis 94. This is, however, not essential and the caps 91 may be positioned relative to the outlet ends 87 of the delivery ducts in a different manner to that which has been described and that is illustrated in FIG. 8.

FIGS. 9 and 10 of the drawings illustrate a spreading member construction in which a delivery duct 100 that corresponds to the previously described duct 19 has an outlet end 101 of curved downwardly directed formation, a terminal part of that end 101 being, however, of rectilinear formation. A spreading member 102 is connected to the outlet end 101 in a freely rotatable manner by means of a ball bearing 103 whose construction and arrangement is not shown in detail. The whole spreading member 102 can thus rotate around the upright longitudinal axis 110 of the rectilinear terminal portion of the outlet end 101 of the duct 100. The spreading member 102 has two diametrically opposed tubular limbs 104 and 105 that extend perpendicularly away from an inlet opening 109 that is rotatably connected to the mouth of the outlet end 101. The free ends 107 and 108 of the two limbs 104 and 105 are bent over through substantially 90L in generally opposite directions so that both of them are inclined downwardly towards the ground surface. The inlet opening 109, the tubular limbs 104 and 105 and their free ends 107 and 108 are all of a substantially circular cross-section whose size is the same as that of the delivery duct 100 and its outlet end 101. A guide 106 of inverted V-shaped cross-section is arranged at the bottom of the junction between the two tubular limbs 104 and 105 in register with the overlying inlet opening 109 and assists in directing material from the duct 100 towards the free ends 107 and 108 of the two limbs 104 and 105.

In the use of the spreading implement when furnished with the construction that has been described with reference to FIGS. 9 and 10 of the drawings, a stream of air containing entrained granular material will pass through the duct 100 towards its outlet end 101. That stream enters the spreading member 102 and is subdivided into two substantially equal streams substantially automatically but with the assistance of the guide 106. The two resulting streams of air and entrained material leave the downwardly directed free ends 107 and 108 of the tubular limbs 104 and 105 and, since those free ends point in relatively opposite directions, the issuing streams of air exert a force couple upon the member 102 and cause it to rotate about the axis 110 relative to the end 101 of the duct 100. The granular material that issues with the streams of air is directed downwardly towards the ground surface in a spiral manner so that a circular distribution pattern results.

The dimensions of each spreading member 102 are preferably so chosen that each of them will spread material throughout a strip of land that at least partly overlaps the strip corresponding to its neighbour. As in the preceding embodiments, it is preferred that the strip of land throughout which each spreading member 102 distributes material should have a width that is substantially twice the distance betwen two immediately neighbouring spreading members. As considered in a horizontal direction perpendicular to the direction 42 the spreading members of the embodiments that have so far been described are regularly spaced apart from each other, However, this is not essential since there are circumstances, for example when plants are to be grown under row culture, when it would be unnecessarily wasteful to distribute material substantially uniformly over all of the surface traversed. Under such circumstances, the distances between the individual spreading members may be varied s compared with what is illustrated in FIGS. 2 and 4 of the drawings so that, for example, artificial granular fertiliser reaches substantially only the locations of the rows at which plants are to be grown under row culture.

FIG. 11 of the drawings illustrates the employment of a rotary power-driven spreading member 115. The spreading member 115 is fastened to the lowermost end of an upright shaft 116 that is rotatably journalled in a downwardly directed curved outlet end 117 of a delivery duct 118 that corresponds to the previously described duct 19. The spreading member 115 comprises a substantially circular plate 119 whose center coincides with the upright longitudinal axis 121 of the shaft 116 and a plurality of ejector blades 120 mounted on top of the plate 119 in regularly spaced apart relationship around the axis 121. It will be seen from FIG. 11 of the drawings that a central region 124 of the plate 119 surrounds the lower end of the shaft 116 in such a way as to produce an upwardly tapering surface designed to direct granules of fertiliser or other material which strike it after ejection from the outlet end 117 of the duct 118 outwardly towards the inner ends of the blades 120. The blades 120 are spaced outwardly from the axis 121 by a distance which is such that the mouth of the duct end 117 is located between them. The uppermost end of the shaft 116 is provided with a pulley 122 which co-operates with a V-belt or the like 123 that is driven in a manner which is not illustrated in detail in the drawings but which may include, for example, a gear box similar to the previously described gear box 8.

In the operation of the spreading implement when furnished with spreading members 115 as described with reference to FIG. 11 of the drawings, a stream of air containing entrained granular material will flow through the duct 118 and its outlet end 117 and will emerge downwardly onto the shaped central region 124 of the circular ejector plate 119. The whole spreading member 115 will, during operation of the implement, be rapidly rotating around the axis 121 and the granules of material that strike the central region 124 of the plate 119 are immediately guided by that plate towards the blades 120 where the granules are flung more or less radially outwardly away from the member 115 as a result of the centrifugal force which is imparted to them by the plate 119 and particularly its blades 120. The shape and number of the blades 120 and the speed of rotation of the whole member 115 about the axis 121 are, of course, chosen so that the material is spread by each member 115 throughout a strip of the required width. All the members 115 pesent in the implement may be coupled with a driving mechanism so that they all rotate in the same direction and with the same speeds around their axis of rotation.

FIG. 12 and 13 of the drawings illustrate a spreading member construction in which a delivery duct 131 that corresponds to the previously described duct 19 has an outlet end in the form of an oblique mouth 136 that is directed generally downwardly towards the ground surface. A freely rotatable spreading member 130 is arranged alongside the mouth 136 and can revolve about the axis of a shaft 132 that is supported by a plate 133 which projects from one side of the duct 131 close to its mouth 136. It will be seen from FIG. 12 of the drawings that the axis of rotation that is defined by the shaft 132 is perpendicular to the plane of the mouth 136. The axis of rotation of the spreading member 130 is thus significantly inclined according an angle 134 to the vertical. The spreading member 130 has a central portion from which a plurality, such as eight, of blades 135 project substantially radially at regular intervals around the axis of rotation that is defined by the shaft 132. As can be seen in FIGS. 12 of the drawings, each blade 135 is of curved cross-section and is arranged so that the convex side of the curve is foremost with respect to the intended direction of operative rotation (FIG. 13) of the spreading member 130. The oblique plane of the mouth 136 is parallel, and very close, to the general plane of the upper surface of the spreading member 130 and it can be seen from FIG. 13 of the drawings that said mouth is in register with the path of rotation of the blades 135 and in spaced relationship with the shaft 132.

In the use of the spreading implement when furnished with the spreading members 130 that have been described with reference to FIGS. 12 and 13 of the drawings, a stream of air containing entrained granular material passes through the delivery duct 131 to its mouth 136, The issuing air and entrained material strikes the blades 135 and causes the spreading member 130 to revolve in the direction indicated by an arrow in FIG. 13. The speed of rotation is quite rapid an that rotation, together with the curved shape of each blade 135, causes the material to be directed downwardly towards the ground surface in a gnerally fan-shaped pattern. It is possible to omit the blades 135 and to shape the periphery of the central region of the spreading member 130 in such a way that rotation of that member is caused by impingement of the air stream and entrained granules against the periphery. Once again, the rotation of the spreading member will cause the material to be substantially uniformly spread in a more or less fan-shaped pattern.

Although various features of the different embodiments of spreading implement that have been described and that are illustrated in the accompanying drawings will be set forth in the following claims as inventive features, it is emphasised that the invention is not necessarily limited to those features and that it includes within its scope each of the parts of each spreading implement embodiment that has been described and/or that is illustrated in the accompanying drawings both individually and in various combinations.

What we claim is:

1. A spreading implement comprising a frame and a container for material to be spread, the lower part of said container having port means and a rotatable ejector disc, a plurality of elongated delivery ducts extending substantially horizontally from said container in directions generally transverse to the normal direction of travel of the implement, the inner ends of said ducts being in communication with said port means and an air chamber that surrounds said port means, a pneumatic device communicating with said chamber and said ducts, the outer ends of said ducts being spaced apart from one another and being located at different lateral distances from said ejector disc, a movable spreading member being positioned adjacent each outer end and driving means associated with said spreading member, said driving means moving the spreader members to uniformly distribute material over a broad path during operation.

2. A spreading implement comprising a frame, a container with outlet port means and a rotatable spreader positioned adjacent the port means, a control mechanism associated with said port means that controls the flow of material out of said container to said spreader, said port means communicating with an air chamber having a pneumatic device, a plurality of elongated delivery ducts extending substantially horizontally from said air chamber and laterally from said container with respect to the normal direction of travel of said implement, the inner ends of said ducts being in communication with said air chamber and the outer ends of said ducts being outlets associated with corresponding rockable spreading members, driving means connected to rotate said spreader and said driving means including at least one reciprocable driving rod that is connected to at least one spreading member, said pneumatic device communicating a stream of air through said chamber into the inner ends of said ducts and out of said outer ends together with entrained material to said spreading members, said one spreading member being rocked by said driving means to distribute material over a broad path during operation.

3. A spreading implement comprising a frame and a container for material to be spread, the lower part of said container having port means and a rotatable spreader mounted adjacent said port means, a plurality of elongated delivery ducts extending substantially horizontally from said container, in directions generally transverse to the normal direction of travel of the implement, the inner ends off said ducts being in communication with said port means and an air chamber that surrounds said port means, a pneumatic device communicating with said chamber and said ducts, the outer ends of said ducts being spaced apart from one another and being located at different lateral distances from said ejector disc, a rotatable spreading member being positioned adjacent each outer end and driving means connected to rotate said spreader and each spreading member, said driving means rotating the spreader members to distribute material over a broad path during operation.

4. A spreading implement comprising a frame, a container with outlet port means and a rotatable spreader positioned adjacent the port means, a control mechanism associated with said port means that controls the flow of material out of said container to said spreader, said means communicating with an air chamber having a pneumatic device, a plurality of elongated delivery ducts extending substantially horizontally from said air chamber and laterally from said container with respect to the normal direction of travel of said implement, the inner ends of said ducts being in communication with said air chamber and the outer ends of said ducts being located at different lateral distances from said spreader and from one another, said outer ends of the ducts being outlets with corresponding movable spreading members, driving means connected to said spreader and said pneumatic device, said pneumatic device communicating a stream of air through said chamber into the inner ends of said ducts and out of said outer ends together with entrained material to said corresponding spreading members, said spreading members being associated with and moved by said driving means to distribute material over a broad path during operation.

5. An implement as claimed in claim 4, wherein each spreading member is rockably mounted on a pivot on said implement.

6. An implement as claimed in claim 5, wherein said duct terminates in a flexible portion and said driving means is connected to the flexible portion.

7. An implement as claimed in claim 6, wherein said flexible portion comprises an oscillatory spreading nozzle.

8. An implement as claimed in claim 7, wherein said spreading nozzle is substantially circular in cross-section.

9. An implement as claimed in claim 8, wherein said nozzle is pivotably connected to a reciprocatory driving mechanism of the driving means.

10. An implement as claimed in claim 9, wherein said nozzle has a delivery end directed downwardly towards the ground.

11. An implement as claimed in claim 4, wherein there are a plurality of delivery ducts each of which has an outer spreading nozzle comprising a flexible tube, the inner portions of the ducts extending substantially horizontally and the delivery outlet of each nozzle being directed downwardly and being rockably connected to said driving means.

12. An implement as claimed in claim 11, wherein each nozzle is rockable about a corresponding axis that is inclined to both the horizontal and the vertical.

13. An implement as claimed in claim 12, wherein each nozzle is rigidly secured to an arm and the arm is pivotably connected to said driving means.

14. An implement as claimed in claim 12, wherein each nozzle comprises a portion of right circular cylindrical configuration that adjoins an inner portion of the respective duct and said inner portion is right circular cylindrical in configuration.

15. An implement as claimed in claim 14, wherein each nozzle has a slotted mouth and said mouth is widest in a direction substantially parallel to a vertical plane that extends in the normal direction of travel of said implement.

16. An implement as claimed in claim 13, wherein each nozzle has a longitudinal axis inclined to both the horizontal and the vertical at an angle of about 45Land the direction of inclination is forward with respect to the direction of travel.

17. An implement as claimed in claim 4, wherein each spreading member comprises a spreading plate positioned adjacent the outer end of each duct, whereby material issuing from said duct will impinge upon the spreading plate.

18. An implement as claimed in claim 17, wherein said spreading plate comprises a cap-shaped plate with a convex side that faces the outer end of said duct, said plate being secured to a corresponding supporting rod which is pivotably mounted on said implement.

19. An implement as claimed in claim 18, wherein said supporting rod is pivotably connected to said duct and also pivotably connected to a reciprocatory driving rod of said driving means.

20. An implement as claimed in claim 4, wherein each spreading member is rockable about a corresponding nonhorizontal axis by said driving means.

21. An implement as claimed in claim 10, wherein the rockable spreading members are coupled to a common driving mechanism of said driving means and said spreading members are connected to move in synchronism.

22. An implement as claimed in claim 4, wherein each movable spreading member is rotatably mounted adjacent the end of a corresponding duct.

23. An implement as claimed in claim 12, wherein said spreading member is freely rotatable about a shaft and said pneumatic device moves a stream of air through said duct and through said spreading member.

24. An implement as claimed in claim 13, wherein said spreading member comprises a tubular limb with a free end that is spaced from said shaft in non-radial relationship with the axis of rotation of said spreading member.

25. An implement as claimed in claim 14 wherein said spreading member comprises two opposed tubular limbs having free ends that extend in relatively opposite directions and exiting air from said pneumatic device rotates the spreading member about said shaft.

26. An implement as claimed in claim 4, wherein each spreading member is rotatable and has a plurality of substantially radial blades, the end of a corresponding outer duct end adjoining said spreading member between the radially inner ends of those blades.

27. An implement as claimed in claim 26, wherein each spreading member is mounted on a shaft that is journalled on a corresponding duct.

28. An implement as claimed in claim 27, wherein each spreading member is rotatable about a substantially vertical axis.

29. An implement as claimed in claim 4, wherein each spreading member comprises a rotatable disc on which spreading blades are mounted, said disc being connected to a rotary shaft and having a shaped central region that guides material received from the outer end off the respective duct towards radially inner ends of said blades.

30. An implement as claimed in claim 4, wherein there are a plurality of ducts with corresponding spreading members connected to a common driving mechanism, at least two of said spreading members being rotatable about corresponding axes in the same directions.

31. An implenent as claimed in claim 4, wherein each spreading member is rotatable with a plurality of substantially radial blades, said blades being in register with the end of a corresponding outlet end whereby, during operation, material received from said duct is spread by the blades.

32. An implement as claimed in claim 31, wherein said spreading member is rotatable about an axis that is inclined to both the horizontal and the vertical.

* * * * *